455-609 AU 233 EX
FIP8106 XR 3,699,344

[redacted]

United Stat [redacted] [15] 3,699,344
Rutz [45] Oct. 17, 1972

SD

[54] OPTICAL PULSE COMMUNICATION SYSTEM USING A PSEUDO-RANDOM SEQUENCE FOR SYNCHRONIZATION

[72] Inventor: Elisabeth M. Rutz, Bethesda, Md.
[73] Assignee: International Business Machines Corporation, Armonk, N.Y.

[22] Filed: Feb. 26, 1971
[21] Appl. No.: 119,276

[52] U.S. Cl...................250/199, 179/15 R, 350/171, 178/69.5 R
[51] Int. Cl...............................H04b 9/00, H04j 3/00
[58] Field of Search.250/199; 178/69.5 R; 179/15 R; 350/171

[56] References Cited

UNITED STATES PATENTS

| | | | |
|---|---|---|---|
| 3,506,834 | 4/1970 | Buchsbaum et al. | 250/199 |
| 3,521,068 | 7/1970 | Armstrong et al. | 250/199 |

*Primary Examiner*—Robert L. Griffin
*Assistant Examiner*—Peter M. Pecori
*Attorney*—Hanifin & Jancin and Thomas F. Galvin

[57] ABSTRACT

In a time-division multiplexed optical communication system, a coded optical waveform is transmitted with the data sequence. The waveform follows a type of pseudo-random sequence termed an incoherent coded word. At the receiver, the coded and data sequence are demultiplexed into separate channels and combined with an identical reference sequence generated at the receiver. Each combined reference and demultiplexed pulse of the sequences is detected at an associated coincidence detector. The demultiplexing means also presents each pulse of the multiplexed beam to each coincidence detector. If the reference and demultiplexed sequences are out of synchronization, the reference sequence may combine with these unwanted pulses, thereby yielding false outputs from the detectors. The properties of the pseudo-random coded sequence are used to ensure that this situation will be noted and the false outputs ignored.

When the demultiplexed and reference sequences are in synchronization, the combined coded synchronization pulses of the demultiplexed and reference sequences are received simultaneously at their associated coincidence detectors in the synchronization channels. The outputs from the detectors are fed to a single photomultiplier-matched filter. The filter is conditioned to generate a significant output only when it receives all of the outputs from the detectors in the synchronization channels simultaneously.

If the demultiplexed and reference sequences are out of synchronization, the properties of the pseudorandom coded sequence ensure that not more than one reference and demultiplexed pulse of said coded synchronization sequence is received simultaneously at the matched filter. Under this condition, the filter will generate virtually no output.

To ensure that optical pulses of the data sequence do not combine with the synchronization sequence at the receiver, means are provided for excluding all pulses except synchronization pulses from the synchronization channels.

Means are also provided for initially establishing the synchronization between the received and reference sequences and also for automatically synchronizing the sequences if they are out of sync for less than the period between multiplexed pulses.

16 Claims, 7 Drawing Figures

PATENTED OCT 17 1972

3,699,344

INVENTOR

ELISABETH M. RUTZ

BY Thomas F. Galvin

AGENT

OPTICAL PULSE COMMUNICATION SYSTEM USING A PSEUDO-RANDOM SEQUENCE FOR SYNCHRONIZATION

BACKGROUND OF THE INVENTION

1. Field of the Invention

The subject invention pertains to optical communication systems capable of transmitting information at very high rates. More particularly, the invention relates to a digital optical communication system using a pulse code modulation format. Pulses from a mode-locked laser are transmitted on separate communication channels and multiplexed into a single channel. At the receiver, the pulses are sorted out and detected.

2. Description of the Prior Art

Attempts to transmit information at high data rates by means of optical communication systems have been limited in the past by the low bandwidths of the optical modulators and detectors. More recently, systems have been developed within the optical domain to overcome this problem. The systems generally involve optically multiplexing a large number of channels having a limited bandwidth onto a single channel, thereby yielding a single output beam with a much greater bandwidth than would be possible otherwise.

One such system is described by Armstrong, et al. in U.S. Pat. No. 3,521,068, which is assigned to the same assignee of the present application. In this system a mode-locked laser emits a train of ultra-short pulses, each pulse being made to pass through an apertured plate having N openings. This results in a sequence of N diminished pulses transmitted in parallel fashion for each mode-locked pulse. In the path of each of the N diminished pulses is a light modulator, a mirror, and a beam splitter. Each light modulator or shutter is controlled by an independent binary data channel. The optical paths traversed by the end pulses, before they are all combined into a single train, are each of a different and characteristic length, so that the pulses are non-overlapping in time and occur in a definite sequence. A multiplexed single beam of interleaved pulses is then transmitted to a receiver where the beam is expanded and then divided by a second apertured plate to present N trains of the N identical pulses to a detector array.

In the detection scheme used with the multiplexer, the transmitter is synchronized with the receiver by means of a local oscillator which provides N clock pulses separated in time. The clock pulses have the same widths as the pulses from the transmitter. A separate one of these N clock pulses is combined with each of the N received multiplexed pulses. A crystal detector senses the overlapping of a clock light pulse with a data light pulse to yield an output.

Another such system is described by T. S. Kinsel in his article "Wide-Band Optical Communications Systems: Part I - Time Division Multiplexing," Proc. I.E.E.E., Vol. 58, No. 10, October 1970, pages 1666–75. Kinsel provides a multiplexed output beam having a large bandwidth in a fashion similar to Armstrong, et al. At the receiver he demultiplexes the pulses in one of two ways: "time-sorting" or "space-sorting." In the time-sorting technique, an alternating polarization state is imposed on the multiplexed stream by an electro-optic modulator. Alternate pulses are then separated by a polarization-sensitive device which spatially separates the differently polarized channels, half appearing at one output and half at the other. Kinsel continues the process in a binary tree arrangement until the number of channels equals the number of multiplexed pulses, each channel having an associated receiver. Kinsel points out that this system is affected by cross-talk which increases as the number of channels increases. In addition, the first modulator device must be able to switch at a rate consistent with the data rate of the input multiplexed beam. For very high data rates this requirement is very severe and may not be realizable in practice.

The space-sorting technique described by Kinsel is similar to the one described in the Armstrong, et al. patent and has the advantage of easing the burden on the electro-optic modulators, there being one modulator per demultiplexed channel. This kind of system, however, imposes stringent requirements on the synchronization of the strobe pulse at the receiver with the input data pulse. In particular, after strobing one of the N channels, each of which contains N pulses, the strobe pulse has to be advanced to the next channel in precise synchronism with the pulse to be detected in that channel. This synchronization is very difficult at the fantastically high data rates involved and a small misalignment between the pulses will cause the system to become inoperative.

It is therefore an object of this invention to improve the synchronization between the transmitter and receiver of optical multiplexed communication systems.

SUMMARY OF THE INVENTION

This object and other objects are accomplished by a time division multiplexed communication system in which each mode-locked pulse is polarized and then divided into a number of diminished parallel pulses in separate transmitter channels. Certain of these channels, termed data channels, contain shutter means for selectively transmitting data pulses in pulse-no pulse fashion. The pulses are then multiplexed onto a single interleaved optical beam and transmitted to a receiver which demultiplexes the received beam into separate receiver channels, reconstructing the original sequence of parallel pulses in the same order.

Each demultiplexed pulse of the original sequence is combined simultaneously with a sequence of reference pulses generated from a mode-locked laser in the receiver. The reference pulses are orthogonally polarized with respect to the demultiplexed pulses and the combined pulses in each receiver channel are detected by a coincidence detector disposed in each channel. The demultiplexing means at the receiver also presents each pulse of the interleaved beam to reach receiver channel.

If the reference sequence is out of synchronization with the demultiplexed sequence, the former may combine with these unwanted pulses, thereby yielding false output at the detectors. To eliminate this problem, I space a certain number, 'N,' of the transmitter channels, other than those used for data pulses, to form a coded optical waveform which follows a type of pseudorandom sequence termed a "perfect incoherent word". This synchronization waveform is transmitted along with the data sequence as part of the interleaved beam. It is reconstructed in separate receiver channels, denoted synchronization channels, and combined with a reference sequence of pulses in the manner described for the data pulses. In simultaneous fashion, each combined demultiplexed and reference synchronization pulse is detected by an associated coincidence detector. The outputs from the detectors are fed to a single photomultiplier-matched filter. The filter generates a significant output only when all N of the combined demultiplexed and reference synchronization pulses are detected simultaneously at the filter, i.e., when the sequences are in synchronization.

If the demultiplexed and reference sequences are out of sync, the properties of the incoherent coded waveform ensure that not more than one of the N combined synchronization pulses is received simultaneously at the matched filter. Under this condition, the filter generates virtually no output, and outputs from the coincidence detectors in the data receiver channels are ignored.

To ensure that demultiplexed optical pulses of the data sequence cannot combine with the synchronization sequence at the receiver, means are provided for excluding the data pulses from the receiver synchronization channels.

Other features of this invention include means for initially establishing the synchronization between the received and reference sequences and tracking means for automatically synchronizing the sequences if they are out of sync for less than the period between pulses.

PROPERTIES OF THE OPTICAL CODED WAVEFORM

Before describing the preferred embodiment of the invention in detail, it will be helpful to discuss the coding technique which is an important part of this invention.

The optical coded synchronization waveform accompanying the optical data pulses is termed a perfect incoherent word which is a sequence having an autocorrelation property defined as follows:

$$C(k)=\sum_{n=0}^{L-1-k} b_n b_{n+k} \begin{matrix} =N \text{ if } k=0 \\ =1 \text{ or } 0 \text{ if } k\neq 0 \end{matrix} \quad (1)$$

where $C(k)$ is the autocorrelation function, $L$ is the total number of bits in the word, $b_n = 1$ or 0 and $N$ is the number of bits in the word having a value of 1.

In practical terms the above property means that the perfect word may be timed shifted for one or more bit periods with the result that there will be at most one agreement in the bits of the original sequence and the time shifted sequence. For example, the sequence 1100101 is a perfect incoherent word. Another example of a four-bit perfect incoherent word is 1010010001. An example of a five-bit perfect word is 101001000100000l. It should be noted that these words are less efficient than the sequence 1100101; the latter has a greater number of '1' bits per total bits than either of the former sequence. At the present time, I know of no analytical technique for forming most efficient perfect incoherent words. However, Berkowitz in his book Modern Radar, Ch. 4, Wiley Publishers, 1965, discusses an empirical method for forming perfect words having any desired number of '1' bits.

The great advantage of the perfect word in the present optical communication system will become apparent in the specification. The advantage can be illustrated in general terms if we visualize a sequence of data pulses accompanied by the perfect incoherent word and a time-shifted sequence of the same data pulses accompanied by a time-shifted replica of the perfect word. Because of the peculiar autocorrelation property referred to above, the probability of confusing the true data sequence with a time-shifted sequence will be very low because of the ease of discrimination between their associated coded sequence.

In the optical multiplexed communication system of my invention, the 1's of the perfect word are represented by optical pulses, the 0's by the omission of pulses. When the demultiplexed synchronization waveform is in time coincidence with an identical reference waveform at the receiver, the number of agreements equals N, the number of optical pulses in the waveform. If the demultiplexed and reference waveforms are not time coincident, the autocorrelation property defined in equation (1) above ensures that the number of agreements never exceeds one.

The foregoing and other objects, features and advantages of the invention will be apparent from the following more particular description of the preferred embodiment of the invention, as illustrated in the accompanying drawings.

DESCRIPTION OF THE PREFERRED EMBODIMENT

Figure 1:
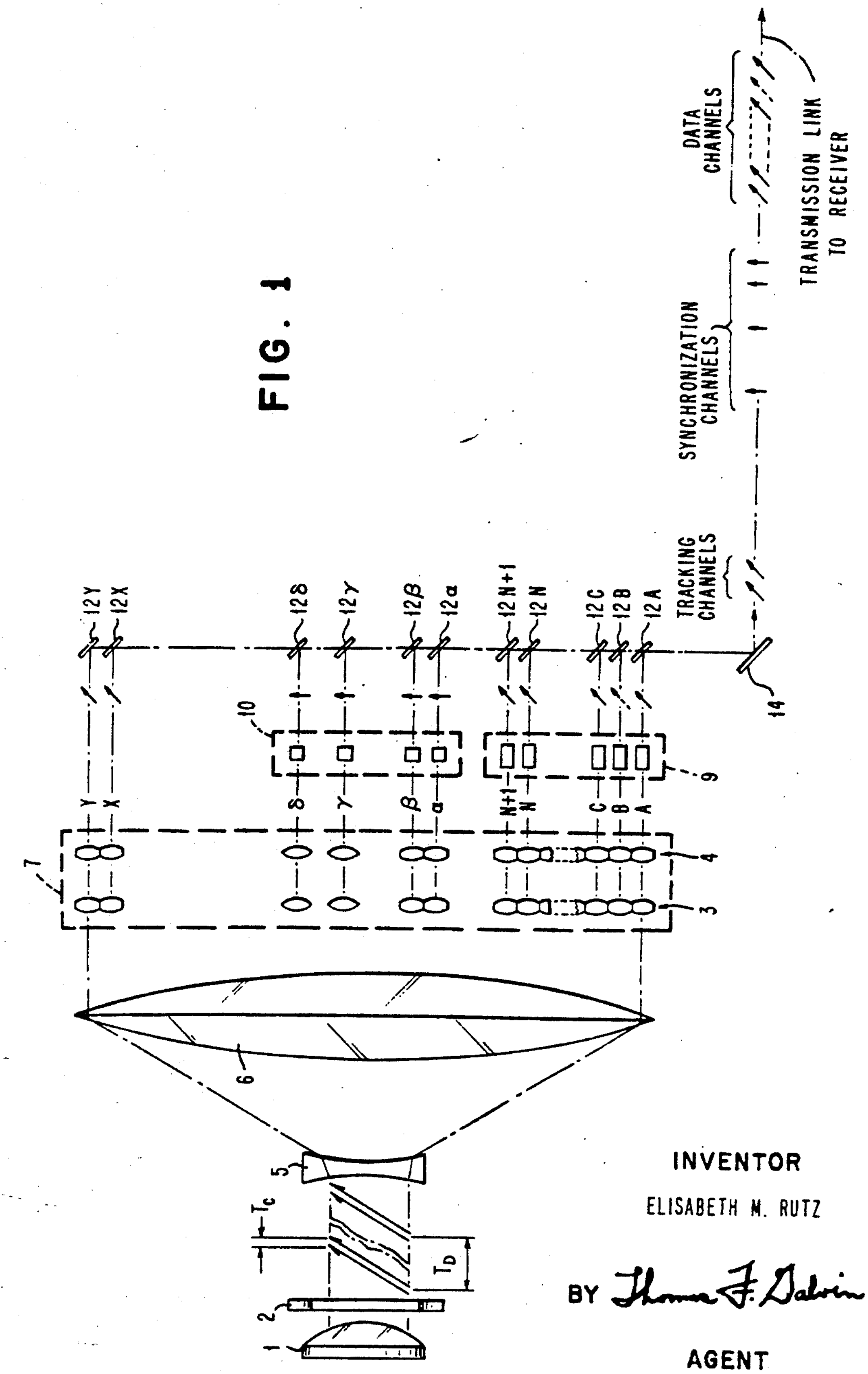
FIG. 1 is a schematic representation of the transmitter of the communication system including the apparatus for multiplexing many channels of information on a single interleaved beam.

In the drawings, FIG. 1 is a schematic diagram of the transmitter of the optical communication system of the present invention. There is shown a source 1 of identical optical pulses, each pulse being delayed by a characteristic time delay, $T_D$. Preferably the source is a mode-locked laser which emits a train of ultra-short pulses having a duration $T_c$. Each pulse is very short compared to the delay between pulses. The characteristics of mode-locked lasers are well known in the art and will not be described further. Those interested in more details should see U.S. Pat. No. 3,521,068 or the article "Method for Pulse Width Measurement of . . . Pulses Generated by Phase-Locked Lasers . . .," Weber, J. A. P., Vol. 38, No. 5, pp. 2231–34, April 1967.

Figures 2, 2A:
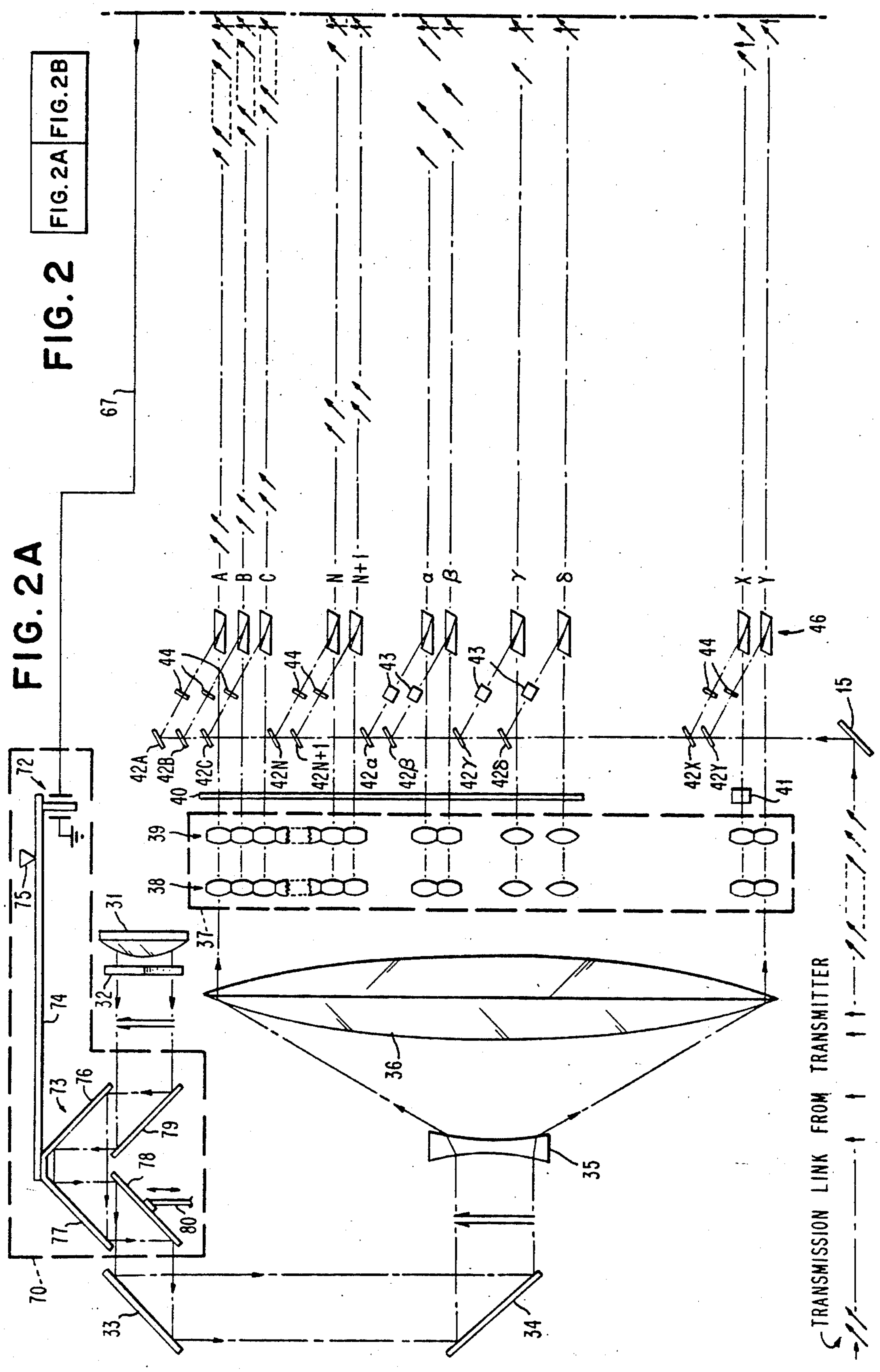
FIG. 2 illustrates the receiver of the system including the apparatus for demultiplexing the single interleaved beam FIG. 2A and for detecting the demultiplexed pulses FIG. 2B.

The pulses from laser 1 pass through polarizer 2 which polarizes the pulses into a single plane. In this embodiment, the plane of polarization is directed into the sheet, which is usually depicted in the following fashion *o* and termed an *o* ray. However, to ensure that the drawing of FIGS. 1 and 2 are perfectly clear, I have chosen to picture the *o* ray in this fashion:// or /. Similarly, I depict *e* pulses polarized orthogonally with respect to the first pulses as:↑↑or↑.

The linearly polarized pulses are each transmitted through a means for broadening the pulse from the laser which preferably comprises an equi-concave lens 5 and an equi-convex lens 6. The pulse emerging from lens 6 is thereby enlarged in coverage and collimated. The collimated pulse from lens 6 is converted into a number of parallel, individual pulses by means of an optical power dividing array 7 which comprises two columns of convex lenses, 3 and 4. The associated lenses in each row of the columns are spaced confocally in the direction of the beam, thereby establishing data transmission channels A, B, C, . . . N, N+1, synchronization transmission channels $\alpha$, $\beta$, $\gamma$ and $\delta$, and tracking transmission channels X and Y, each channel containing a pulse of diminished intensity derived from the original mode-locked pulse.

It will be understood that the focal length of the lenses in array 4 will be shorter than the focal length of the lenses in array 3. This ensures that the beams in each channel do not interfere with beams in the other channels.

Associated with each data channel is a shutter or modulator means of array 9 for selectively passing or turning off the diminished data pulses. Each of the parallel optical data pulses is thereby modulated with a binary sequence of +1's and 0's at the bit rate of the repetition frequency of the mode-locked laser ($1/T_D$). A typical shutter means would be a Kerr cell or a Pockels cell using either the quadratic optic effect or the electro-optic effect. Each modulator is connected, as is well known to persons of skill in this art, to a switchable voltage source (not shown) which causes rotation of the plane of polarization of the input light and allows its transmission or non-transmission.

In FIG. 1, the configuration / is meant to indicate an *o* pulse passed by the modulator, and having a bit value of 1; the configuration ⁄ indicates the absence of a pulse, having a bit value of 0.

Associated with each synchronization channel, $\alpha$ to $\delta$, is a birefringent crystal of array 10. Each crystal in array 10 functions as a "half-wave" plate in the optical path of the pulse passing through its associated channel. The crystals are means for rotating the polarization of the pulses in the synchronization channel orthogonally with respect to the data and tracking pulses. The effect of the half-wave plate is to alter the direction of vibration of the o pulses by 90°. Hence, the o pulses are converted into *e* pulses, denoted as ↑, in the synchronization channels.

The crystals also delay the synchronization pulses by a factor proportional to $d \cdot n_e$ where $d$ is the thickness of the crystal and $n_e$ is its refractive index. This delay is compensated for in the receiver, as will be explained in a later section of this specification.

The spaced, parallel pulses in the data, synchronization and tracking channels are converted into an interleaved multiplexed optical beam by the array of beam splitters 12A, 12B, 12C, . . . 12N, 12+1; 12$\alpha$, 12$\beta$, 12$\gamma$ and 12$\delta$; 12X and 12Y, respectively. The beam splitters are half-silvered and disposed at 45° to the pulses, transmitting the pulses on a single beam out of the transmitter, where they are passed to a transmission link by reflector 14. Hence, this arrangement of beam splitters serves both as a means for providing the path of each channel with a characteristic length different from any other channel path and as a multiplexer.

The beam splitters associated with the data channels are preferably spaced equidistant from each other, thereby imparting the same unit of delay, $T_e$, between each data pulse. In the embodiment illustrated in FIG. 1, the binary sequence on the data channels is 101 . . . 11.

The spacing between the synchronization pulses, on the other hand, is not equidistant. Rather, it is designed to ensure that the synchronization pulses follow a special pseudo-random sequence having the characteristics of a "perfect" incoherent word. In the preferred embodiment illustrated in FIG. 1, the spacing between the synchronization beam splitters 12$\alpha$, 12$\beta$, 12$\gamma$ and 12$\delta$ is $T_e$, $3T_e$ and $2T_e$, respectively. Hence, the "perfect word" formed is 1100101, where the presence or absence of an *e* pulse and an associated beam splitter indicates 1 or 0, respectively.

Tracking beam splitters 12X and 12Y are separated by $T_e$.

It will be understood that the beam splitters may be constructed to have varying reflectivity and transmissivity such that each pulse is relatively of the same intensity. For example, beam splitter 12A might be 85 percent transmissive and 15 percent reflective; beam splitter 12B might be 80 percent transmissive and 20 percent reflective, etc.; beam splitter 12Y is 100 percent reflective. It will also be understood that the maximum number of channels which can be accommodated, including those unused channels in the set of synchronization channels, is $T_D/T_e$. In addition, it is desirable that $T_e$ be as near as practical to $T_c$, the duration of a single mode-locked pulse. In practice, $T_e$ may be twice $T_c$.

In the receiver of the optical communication system shown in FIG. 2, the single interleaved optical beam containing the multiplexed pulses from the transmitter is first transformed to a "time-sorted" beam. The term "time-sorting" is defined as compensating in the receiver for the time delays introduced in the transmitter, thereby equalizing the total path length of each channel and recovering in the receiver the original parallel pulses in the same order. Referring specifically to FIG. 2A, the means for time-sorting the input multiplexed pulses comprises a beam splitter array 42 which duplicates array 12 of FIG. 1 but which is disposed in reverse order from array 12. That is, the received interleaved optical beam impinges first on beam splitter 42Y, and lastly on beam splitter 42A, where beam splitter 42Y in the receiver corresponds to beam splitter 12Y, in the transmitter, beam splitter 42A corresponds to beam splitter 12A, and so on.

Each beam splitter reflects the input multiplexed beam from the transmitter into its associated channel. As indicated in FIG. 2A the beams are time-sorted because the spacings in array 42 are the reverse of the spacings in array 12. This compensates for the time delays introduced in array 12; and, at any given instant of time, one row of pulses in the receiver channels will correspond, channel for channel, to the row of pulses as they appeared in the transmitter channels prior to being reflected from beam splitter array 12.

Half-wave plates 43 are inserted between each beam splitter 42α, 42β, 42γ and 42δ, respectively, and a beam combiner array of nicol prisms 46, one of which is disposed in each of the receiver synchronization channels.

The half-wave plates act as polarizing means for rotating the polarization of the data, tracking and synchronization pulses.

The plates convert the polarization of the synchronization pulses from *e* (↑) to *o* (↗) polarization. In addition, the polarization of the data and tracking pulses reflected from beam splitters 42α to 42δ into the synchronization channels is converted from *o* (↗) to *e* (↑). Plates 43 introduce an additional delay in the path of the synchronization channels, the delay being equal to that discussed previously for half-wave plates 10 in the transmitter.

To compensate for the delays introduced in the synchronization pulses by half-wave plates 10 in the transmitter and plates 43 in the receiver, dielectric slabs 44 are inserted between each beam splitter 42A, 42B, 42C, . . . 42N, 42N+1, 42X and 42Y, and their associated nicol prisms 46 of the receiver data and tracking channels. The slabs have an optical thickness equal to $2n_o d$, where $n_e$ is the refractive index of the half-wave plates and $d$ is their thickness.

Hence, the data, synchronization and tracking pulses of the received beam are in precise spatial alignment when they reach the beam combiner array of nicol prisms 46. In addition, the pulses are time-sorted; i.e., one column of pulses in the receiver corresponds to the original pulses in the transmitter, although diminished in amplitude because of beam splitters 12 and 42 and transmission losses.

The problem with which this invention is concerned is the detection of this column of pulses and the omission of every other column of pulses which present themselves to the detectors of the receiver. In order to monitor and detect the incoming pulses, a second mode-locked laser 31 operates to strobe the received pulses on the receiver channels.

Laser 31 must operate at the same wavelength and repetition rate $T_D$, as laser 1 and the pulses must have substantially the same duration $T_c$. The pulses from laser 31 pass through polarizer 32, which polarizes the pulses into *e* rays. These reference pulses are thus orthogonally polarized with respect to the *o* pulses emitted from polarizer 2 to FIG. 1.

Polarizers 2 and 32 may be dichroic crystals fabricated from tourmaline. The orientation of the crystals is, of course, 90° with respect to each other.

Each reference pulse from polarizer 32 first passes through a variable delay means 70, which operates to vary the optical path of a reference pulse emanating from source 31. In this way, each reference pulse can be delayed or advanced so that it is in synchronism with the time-sorted pulses of the received waveform upon entering beam combiner array 46.

Variable delay means 70 comprises a piezo-electric transducer 72, lever arm 74 attached at one end to the crystal of transducer 72, fulcrum 75 for increasing the effective distance of travel at the end of the lever distal from the transducer 72 and corner cube reflector means 73. Reflectors 76 and 77 of the corner cube are attached to lever 74 thereby moving as the lever moves. Reflector 78 is movably mounted to a holder 80. Reflector 79 is in a fixed position.

Variable delay means 70 provides for a means for coarsely bringing the reference pulses into synchronization and also means for fine-tuning the synchronization. The former is shown as a holder 80 for moving reflector 78 along the optical path of the pulse, increasing or decreasing the length of the path. The fine-tuning is provided by transducer 72.

In the present embodiment, the fine-tuning means is designed to provide time delays and advances up to 25 picoseconds. Piezo-electric crystal 72, the operation of which is well known to those skilled in this art, has a maximum linear movement in the micron region. Hence, the placement of fulcrum 75 is designed to yield a suitable magnification of this motion.

After reflection from mirrors 33 and 34, the pulse is transmitted through equiconcave lens 35 and equiconvex lens 36 which converts it to a broadened, collimated pulse. The collimated beam from lens 36 is converted into a number of parallel, individual, diminished *e* pulses (↑) by means of an optical power dividing array 37 which comprises two columns of convex lenses 38 and 39. The associated lenses in each row of the columns are spaced confocally in the direction of the orthogonally polarized pulses. Each row of lenses in array 37 is associated with one of the nicol prisms in array 46 and in its optical path so that each diminished reference pulse impinges on a nicol prism in beam combiner array 46 associated with it. These pulses do not strike the beam splitter array 42.

Lenses 35, 36 and 37 should match as closely as possible the corresponding lenses in the transmitter.

In the following description, the pulses emanating from power divider array 37 are referred to as the "reference" waveform, as distinguished from the "spatial" waveform of the received pulses which are reflected from beam splitter array 42. It will be noted that the intensity of the reference pulses from lens array 37 will be greater than the intensity of the received pulses reflected from beam splitter array 42. This is not critical because of the detection technique used in this invention where a parametric device is used for detection.

Prior to impinging on the beam combiner array 46 of nicol prisms, the reference waveform associated with the receiver data and synchronization channels, A to N+1 and α to δ, respectively, pass through a fixed delay line 40, having a delay $\Delta t$. The reference waveform associated with tracking channel X passes through delay line 41, having a delay $2\Delta t$. The delays thereby introduced act to symmetrically displace the pulses in tracking channel X from those in tracking channel Y by $2\Delta t$. Time delay $\Delta t$ is preferably set as close as possible to $T_c$, the duration of a single pulse. Then the reference pulse on channel X is delayed from the channel X demultiplexed spatial pulse by $T_c$; and the reference pulse on channel Y is advanced from the channel Y demultiplexed spatial pulse by $T_c$.

Figure 2B:
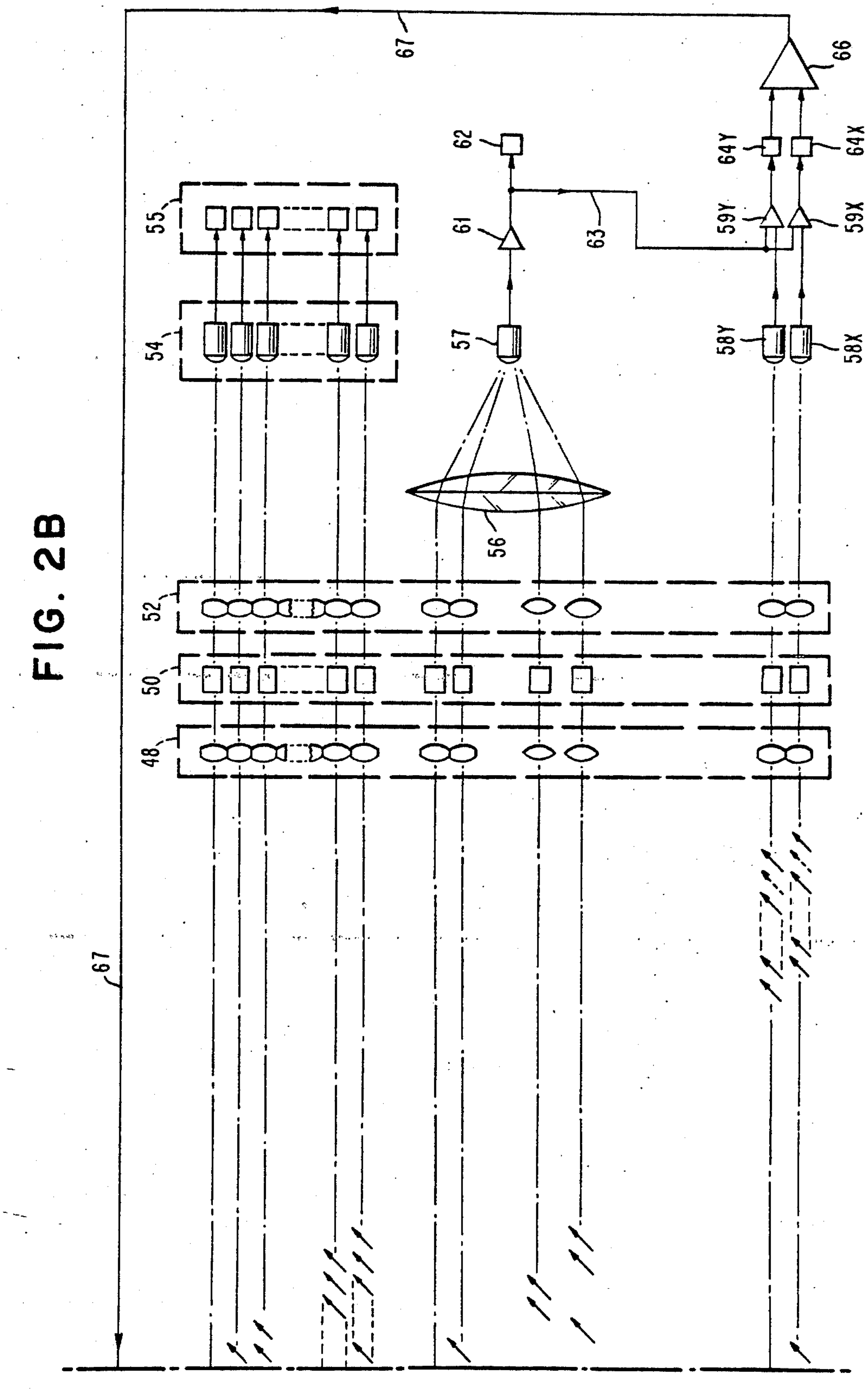

In FIG. 2B it is assumed that the reference and spatial waveforms are precisely synchronized. Hence, at the edge of FIG. 2B the reference data and synchronization pulses (↑) are combined precisely with their corresponding spatial pulses (↗) into combined parallel pulses (↑↗); and the reference pulses in tracking channels 42X and 42Y are delayed and advanced, respectively, by $T_c = ½T_r$ with respect to their corresponding spatial pulses.

The array of nicol prisms 46 serves both as a means for combining the pulses of the reference waveform with the pulses of the spatial waveform, and for reflecting any data pulses on the interleaved optical beam out of the synchronization channels α, β, γ and δ. As previously discussed, the spacing of the nicol prisms is identical to that of the power dividing array 37. Each beam splitter 42 is associated with a corresponding nicol prism 46. Assuming precise synchronization, the combined spatial and reference waveforms, designated ↑↗ in the drawing, are then transmitted through focusing converging lens array 48 to a detector array 50 placed at the focal point of the lens array 48 (FIG. 2B).

The preferred means for detecting the combined pulses comprises a coincidence detector array 50, there being one such detector for each channel in the receiver. The detectors are preferably optical parametric up-converters. As is well known to those of skill in this art, this type of coincidence detector is a nonlinear crystal which generates the second harmonic wave when two coherent optical beams of the same wavelength which are orthogonally polarized and in time coincidence are incident on the crystal. The orientation of the optical axis of the nonlinear crystal with reference to the normal of the input optical beams is determined by the phase matching condition which requires that the sum of the propagation vectors of the two fundamental waves and the second harmonic wave be zero. This requirement is met when the two fundamental input waves enter the crystal as ordinary and extraordinary rays, respectively, while the polarization of the second harmonic output is in the direction of the extraordinary ray.

The output pulses from the coincidence detectors in data channels A, B . . . N+1 are detected by photomultiplier 54 and receivers 55, there being one such photomultiplier and receiver in each channel. Suitable photomultipliers are commercially available; each receiver may be a standard amplitude detector.

The output pulses from the coincidence detectors in the synchronization channels α, β, γ and δ are focused into a single photomultiplier 57 by converging lens 56. Lens 56, photomultiplier 57, amplifier 61 and detector 62 comprise matched filter means for generating an output when the combined pulses on the synchronization channels are received substantially simultaneously at the coincidence detectors. If each reference pulse is precisely aligned with each spatial pulse at the coincidence detectors, then the photomultiplier 57 will sense an input light intensity of 'N', in this case 4, times the output of one coincidence detector. This optical pulse is converted to an electrical pulse, amplified by amplifier 61 and detected by receiver 62. If, however, the reference synchronization pulses are not precisely aligned with the spatial synchronization pulses, then there can be at most one combined reference and spatial pulse received simultaneously at the coincidence detectors. This feature is due to the property of the perfect incoherent word 1101001. It can be appreciated by scanning each column of synchronization pulses in channels α, β, γ and δ of FIGS. 2A and 2B. It will be noted that no column except one contains more than one pulse and that latter column contains four pulses.

Although the optical matched filter alone indicates synchronization between the reference waveform and the spatial waveform, it will not track the two waveforms automatically in case they start moving apart. For this function, an optical tracking loop is added which generates error signals indicating whether the reference waveform is advanced or delayed relative to the spatial waveform. These error signals are then used to automatically correct the time delay between the two waveforms.

Error pulses from the coincidence detectors in the tracking channels X and Y are detected successively by photomultipliers 58X and 58Y, amplifiers 59X and 59Y, and receivers 64X and 64Y, respectively. The output pulses from receivers 64X and 64Y form the input to differential amplifier 66. The difference voltage from the output of D.C. amplifier 66 drives piezoelectric transducer 72 of variable optical delay means 70 via connection 67.

The tracking channels X and Y are used to synchronize the reference and spatial waveforms when they are within one pulse period, i.e., $T_c$, of each other. If the waveforms on the data and synchronization channels are precisely synchronized, the waveforms on the tracking channels will be out of sync because of the delays introduced by delay lines 40 and 41, discussed previously. In this case, no output in photomultipliers 58X and 58Y will be generated. If, however, the data and synchronization waveforms are out of sync for less than one pulse period $T_c$, then one of the photomultipliers 58X or 58Y will conduct, causing differential amplifier 66 to activate variable delay means 70. To prevent the differential amplifier from being activated when the waveforms are out of sync for more than $T_c$, amplifier 61 of the matched filter holds amplifiers 59X and 59Y off through connection 63 until the matched filter begins to conduct.

Figure 3:
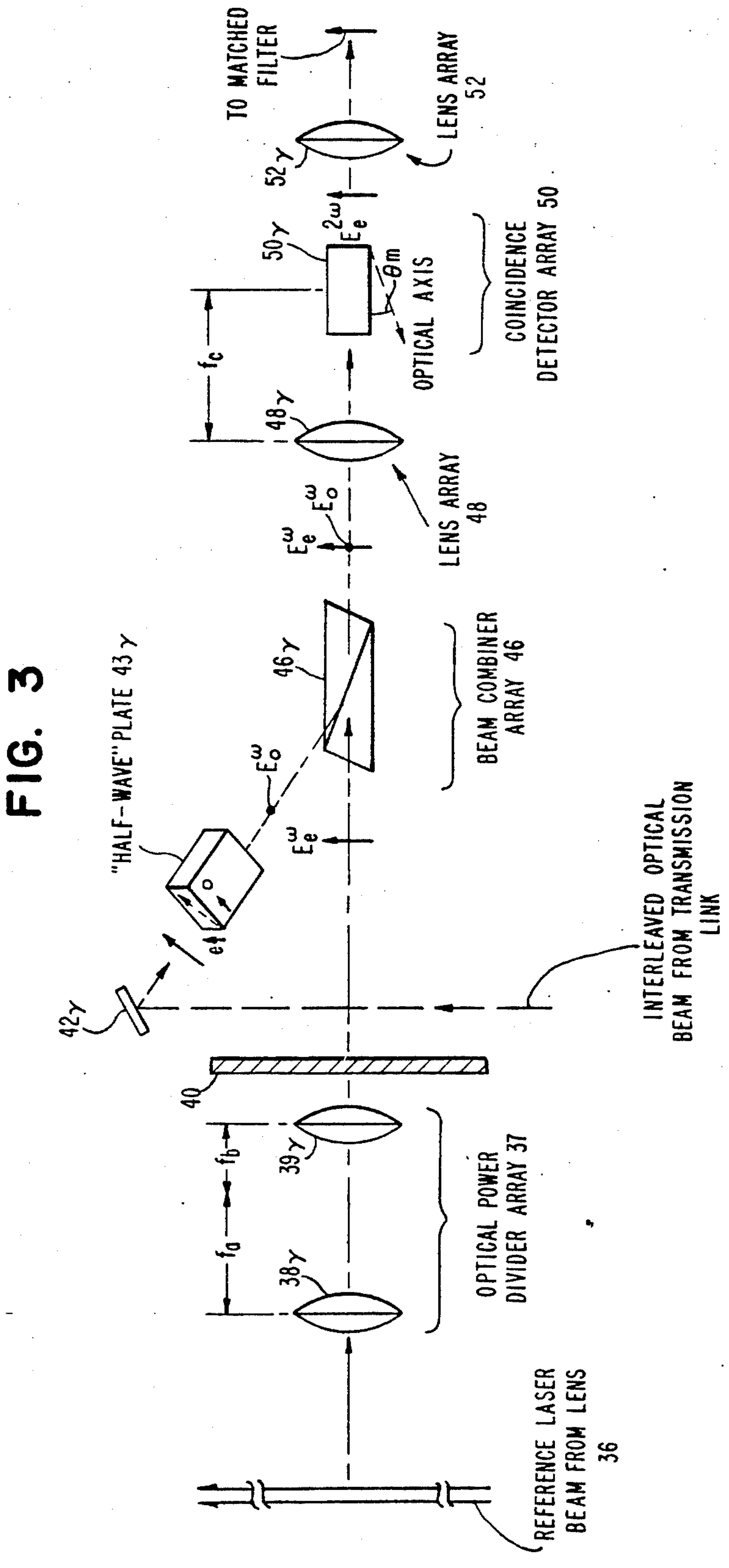
FIG. 3 is a detailed view of a single receiver channel shown in FIG. 2.

FIG. 3 is an expanded view of a single synchronization channel in the receiver of the present invention. Channel γ is selected for illustrative purposes. In FIG. 3, the *e* and *o* rays are shown in the standard form used in textbooks on optics rather than in the form used in FIGS. 1 and 2 of this application. Thus, an *e* ray is denoted as $E_{ew}$↑, and an *o* ray is denoted as $E_{ew}$: *o*, where *w* is the frequency of the light rays. The collimated *e* pulse from lens 36 is divided by optical power divider array 37 comprising lenses 38γ and 39γ which have focal lengths $f_a$ and $f_b$, respectively. The lenses are confocally spaced along the optical path of the beam. As illustrated, $f_b$ is smaller than $f_a$ so that the portion of the reference pulse 36 entering lens 38γ is reduced in size when it exits lens 39γ. The ratio $f_a/f_b$ is not critical; a 2/1 ratio is adequate.

The dimished reference beam, denoted $E_{ew}$, passes through the segment of delay line 40 associated with channel γ and thence to the nicol prism 46γ of the beam combiner array 46 in channel γ. The interleaved optical beam from the transmitter is partially reflected from beam splitter 42$\gamma$ where it is intercepted by half-wave plate 43$\gamma$. It will be recalled that the data and tracking pulses are *o* pulses and the synchronization pulses are *e* pulses. The half-wave plate 43$\gamma$ rotates the polarization of the pulses, thereby converting the synchronization pulses into *o* rays, $E_{ow}$, and the data and tracking pulses into *e* rays, $E_{ew}$, as they exit plate 43$\gamma$. Because of the orientation of nicol prism 46$\gamma$, only the synchronization pulses of the interleaved beam, denoted $E_{ow}$, pass through it into the synchronization channels. The prism reflects the *e* data and tracking pulses out of the system.

Assuming that the reference and spatial pulses are precisely synchronized, the pulses $E_{ew}$ and $E_{ow}$ combined in prism 46$\gamma$ are focused into the coincidence detector 50$\gamma$ by converging lens 48$\gamma$. The output from coincidence detector 50$\gamma$, an optical pulse at the second harmonic, is collimated and directed into a matched filter by lens 52$\gamma$ The significance of removing the data pulses from the synchronization channels lies in the fact that the autocorrelation enhancement occurs only with regard to the synchronization pulses. Hence, the synchronization channel might contain a column of data pulses which would cause the matched filter to generate an output. By removing the data pulses this possibility is eliminated.

The operation of the data and tracking channels is not significantly different from the synchronization channels. Each data and tracking pulses in an *o* ray and, after passing through its associated delay line 44, is combined in nicol prism 46 with the reference pulse. The *e* polarized synchronization pulses which enter the receiver data and tracking channels are reflected out of the system by the nicol prisms.

OPERATION OF THE PREFERRED EMBODIMENT

Referring again to FIG. 1, mode-locked laser 1 of the transmitter is turned on, producing a series of pulses having a duration, $T_c$, say 25 picoseconds. The period between pulses, $T_D$, is about 8 nanoseconds. Mode-locked laser 31 is also turned on at the receiver, producing identical pulses having the same period $T_D$.

After passing through polarizer 2, each mode-locked pulse in the transmitter is broadened by lenses 5 and 6 and passes through the power divider comprising lens array 7 and 8. The lens array divides each mode-locked pulse into a parallel set of diminished pulses on channels A to N+1, $\alpha$ to $\delta$ and X and Y. It will be evident that the spaces between the lenses may be blocked off by an opaque element. This will eliminate any noise and cross-talk which may occur in the system.

During each pulse repetition period of laser 1, certain of the shutters 9 are actuated simultaneously. If a '1' signal is to be transmitted in Channel A, for example, appropriate voltage is applied to modulator 9A in Channel A permitting a diminished laser pulse to be transmitted to mirror 12A. If a '0' signal (no pulse) is to be transmitted, no voltage is applied to the modulator.

Each of the pulses travelling along the synchronization channels $\alpha$, $\beta$, $\gamma$ and $\delta$ pass through birefringent half-wave elements 10. These elements rotate the polarization of the pulses in channels $\alpha$ to $\delta$ orthogonally with respect to the polarization of the data pulses. Hence, the data and tracking pulses are *o* rays and the synchronization pulses are *e* rays. The synchronization pulses are delayed by plates 43 with respect to the data and tracking pulses by a factor $n_o d$ where $n_o$ is the refractive index of the birefringent crystals 10 and *d* is their thickness.

The tracking pulses in channels X and Y proceed unimpeded.

The data, synchronization and tracking pulses are reflected from beam-splitters 12A to 12N+1, 12$\alpha$ to 12$\delta$ and 12X and 12Y, respectively. The beam-splitter array connects the essentially parallel pulses into a serial sequence of interleaved pulses which are reflected from reflector 14 into a single output beam onto a transmission link.

The interleaved synchronization pulses of the coded waveform are spaced to form a "perfect incoherent word."

Any pseudo-random sequence having the following autocorrelation property may be used:

$$(2) \qquad C(k)=\sum_{n=0}^{L-1-k} b_n b_{n+k} \begin{matrix} =N \text{ if } k=0 \\ =1 \text{ or } 0 \text{ if } k\neq 0 \end{matrix}$$

where $C(k)$ is the autocorrelation function, L is the total number of bits in the word, $b_n = 1$ or 0 and N is the number of bits in the word having a value of 1.

In the synchronization waveform shown in FIG. 1, the 1's are represented by optical pulses and the 0's by the omission of pulses. As described previously, the "perfect word" formed in this embodiment is 1101001.

Referring now to FIG. 2 and in particular FIG. 2A, the interleaved output beam is transmitted across the transmission link and reflected by reflector 15 into receiver beam splitters 42Y . . . 42A. Deflector 15 is, of course, not required for operation of this system but is shown only for convenience. As already discussed, beam splitter array 42 "time-sorts" the beam. The entire interleaved beam is reflected into each receiver channel A through Y. Because the beam splitters are arranged in reverse order from the beam splitters in the transmitter, the original set of parallel transmitted pulses is reconstructed in the receiver channels in parallel fashion. The reconstructed set of demultiplexed pulses is termed the spatial waveform.

The beams reflected from the data and tracking beam splitters pass through the delay elements 44 which delay the beams by a factor of $2n_o \cdot d$. The beams reflected from the synchronization beam splitters pass through half-wave plates 43. Plates 43 rotate the polarization of each pulse in the beam to its mutually orthogonal polarization state. Thus, the *o* polarized data and tracking pulses become *e* polarized and the *e* polarized synchronization pulses become *o* polarized. Plates 43 also delay the beams by a factor $n_o \cdot d$ as previously described with respect to half-wave plates 10 (FIG. 1). Thus, prior to entering beam combiner array 46, the data, synchronization and tracking pulses from beam splitter array 42 are in precise spatial alignment, i.e., time-sorted, in their respective channels. These pulses are combined with the reference pulses in the nicol prisms which constitute the beam combiner array 46.

Each nicol prism is disposed to transmit an *e* reference pulse and an *o* spatial pulse into the receiver channels. However, it reflects an *e* spatial pulse out of the system. Thus, the data and tracking spatial pulses, which are *e* polarized by half-wave plates 43, are reflected out of the synchronization channels by the nicol prisms. This ensures that the data and tracking pulses do not interfere with the autocorrelation enhancement of the synchronization pulses.

The reference pulses generated from laser 31 pass through polarizer 32, thereby causing the pulse to be polarized in the *e* plane. Each pulse passes through variable delay means 70 which comprises a means for coarsely bringing the reference pulses into synchronization with the spatial pulses and a means for fine-tuning the synchronization. The former may be quite simple It is shown as a holder 80 for moving reflector 78 along the optical path of the pulse, increasing or decreasing the length of the path.

The fine-tuning means comprises basically piezoelectric transducer 72, fulcrum 75, arm 74 and mirrors 73 and 77 which are movably mounted on the arm.

In operation, when a D. C. signal is received from tracking amplifier 66 through connection 67 at the plates of transducer 72, the crystal will move vertically for a distance dependent on the value of the signal. This motion is magnified through fulcrum 75 to reflectors 76 and 77 of corner cube 73. The path which the pulse from source 32 travels is thereby varied in a very small increment as it is successively reflected from reflectors 79, 76, 77 and 78, respectively.

After reflection from mirrors 33 and 34, the pulse is converted into a broadened, collimated pulse by lenses 35 and 36. The collimated beam from lens 36 is converted into a number of parallel, individual, diminished, *e* reference pulses (↑) by means of an optical power dividing array 37. Each pulse impinges on its associated nicol prism of beam combiner array 46 after passing through delay lines 40 in the case of data and synchronization reference pulses, and delay line 41 for the tracking reference pulse in channel X.

Assuming precise synchronization, the combined spatial and reference waveforms, designed ⤉ in the drawing, are then transmitted through lens array 48 to coincidence detector array 50 (FIG. 2B).

The output pulses from the coincidence detectors in data channels A, B . . . N+1 are detected by photomultiplier 54 and receivers 55.

The output pulses from the coincidence detectors in the synchronization channels $\alpha$, $\beta$, $\gamma$ and $\delta$ are focused into the matched filter means which generates an output when the combined pulses on the synchronization channels are received substantially simultaneously at the coincidence detectors. If each reference pulse is precisely aligned with each spatial pulse at the coincidence detectors, then the photomultiplier 57 will sense an input light intensity of 'N', in this case, four times the output of one coincidence detector. This optical pulse is converted to an electrical pulse, amplifier by amplifier 61 and detected by receiver 62.

If, however, the reference synchronization pulses are not precisely aligned with the spatial synchronization pulses, then there can be at most one combined reference and spatial pulse received simultaneously at the coincidence detectors. As previously discussed, this key feature is due to the autocorrelation property as defined in equation (2) above. Every column of pulses in the synchronization channels can be visualized as a time-shifted sequence of any other column. The autocorrelation enhancement of the perfect incoherent word ensures that no more than one pulse will appear in any column except one. In the latter column, all 'N' of the pulses will appear. This important result may be noted by referring to each column of pulses in receiver channels in FIG. 2. It may be seen that no more than one spatial synchronization pulse (↗) appears in any column except the column containing the aligned spatial waveform as reconstructed. In this column, there are four synchronization pulses. Hence, the output of the matched filter will clearly indicate when the waveforms are synchronized. If the waveforms are out of synchronization by as little as the period between pulses, $T_c$, the matched filter yields virtually no output and any output from the data receivers 55 is ignored. It will be evident that means may be provided for automatically turning off receivers 55 or detectors 54 until the matched filter generates an output.

Although the optical matched filter alone indicates synchronization between the reference waveform and the spatial waveform, it will not track the two waveforms automatically in case they start moving a part. In this event, the output form the matched filter will decrease below the maximum and may yield an ambiguous reading if the reference and spatial waveforms are within one pulse period, $T_c$, of each other.

Figure 4:
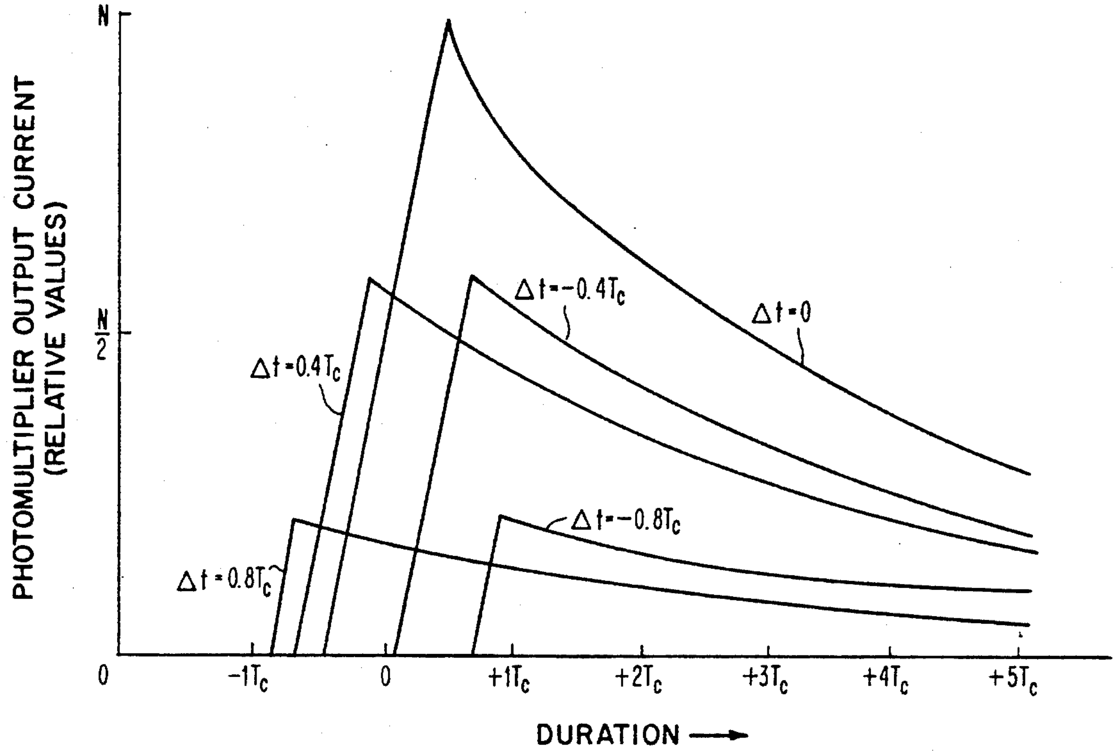
FIG. 4 is a graphical comparison of the normalized output current of a photomultiplier-matched filter receiving N combined pulses when the N pulses are precisely synchronized and when they are not.

This condition is shown in FIG. 4 which illustrates the normalized autocorrelation enhancement of the synchronization pulses at the output of photomultiplier 57 of the matched filter. The outputs from the coincidence detectors are assumed to be rectangular pulses having a duration $T_c$. The limited bandwidth of the photomultiplier produces an asymmetrical autocorrelation function but the maximum amplitude at $\Delta t = 0$ is clearly discernible.

When $\Delta t = 0$, the reference and spatial synchronization pulses are precisely in synchronization and the photomultiplier output has a relative magnitude of N. When the spatial pulses are advanced or delayed, $\Delta t = 0.4T_c$ or $-0.4T_c$, respectively, with respect to the reference pulses, the output is approximately N/2.

To evaluate the autocorrelation function, the electro-optical conversion process must be considered. In photomultiplier 57 the photo-cathode response time, i.e., the time for photo-excitation of electrons, is in the order of $10^{-12}$ seconds. However, the response time of the multiplication process is limited by transit-time dispersion which arises from the spread in electron emission velocity to approximately $10^{-10}$ seconds. In the cathode of photomultiplier 57, the energy of the synchronization pulses is converted into photo-excited electrons.

The photo-current is proportional to the average rate of excited electrons which in turn is proportional to the optical power. Because of the linear relationship between optical power and photo-current, and because of the fast response of the photo cathode, current pulses are generated similar in shape to the mode-locked optical pulses.

The amplitude of the current pulses at the cathode of the photomultiplier of the optical matched filter is:

$$I = N\frac{\eta q}{h\gamma}P_{2\omega} \qquad (3)$$

When the reference waveform and the spatial waveform are not in synchronism, the current pulses at the cathode of photomultiplier 57 of the optical matched filter from the mirror peaks of the correlation function cannot be larger than the value computed in equation (3) above for N=1, where: $\eta$ is the efficiency of the photo-cathode for the conversion of a photon $h\gamma$ into an electron with the charge $q$; $P_{2\omega}$ is the power at the second harmonic wave from one of the coincidence detectors in the synchronization channels $\alpha$ to $\delta$; and N is the number of synchronization pulses; in this example, N=4.

When the reference waveform and the spatial waveform are in time coincidence, the width of the current pulses at the photo cathode is the same as the width $T_c$ of the mode-locked optical pulses.

The effect of the transit time dispersion in the multiplication stages of the photomultiplier can be represented by a low-pass filter with a time constant of $T_e = 10^{-10}$ seconds. To illustrate the effect of the transit time dispersion, the current pulses at the output of the photomultiplier are shown in FIG. 4 for $T_c = 0.25 \times 10^{-10}$s and $T_e = 10^{-10}$ sec. As may be seen, the transfer of the current pulses through the multiplication stages of the photomultiplier results in reduction in amplitude, considerable broadening of the pulses, as well as distortion of their shape.

As already indicated, the tracking channels X and Y are used to synchronize he reference and spatial waveforms when they are within one pulse duration $T_c$ of each other. If the waveforms on the data and synchronization channels are precisely synchronized, the waveforms on the tracking channels will not overlap because of the delays introduced by delay lines 40 and 41 discussed previously. In this case, no output in photomultipliers 58X and 58Y will be generated. If, however, the data and synchronization waveforms are out of sync for less than one pulse duration $T_c$, then one of the photomultipliers 58X or 58Y will conduct. This error signal is amplified and detected at the appropriate amplifiers 59X or 59Y and receiver 64X or 64Y, respectively. The output pulses from the receivers form the input to differential amplifier 66 which is arranged to generate a positive or negative difference voltage depending on whether 58X or 58Y is conducting. The difference voltage from the output of D. C. amplifier 66 drives piezoelectric transducer 72 of variable optical delay means 70 via connection 67. Depending on the polarity of the voltage and its amplitude, the transducer moves up or down, imparting the same movement to lever arm 74. This serves to vary the optical path of the reference waveforms, thereby synchronizing them with succeeding spatial waveforms.

To prevent the differential amplifier from being activated when the waveforms are out of sync for more than $T_c$, the period between pulses, amplifier 61 of the matched filter holds amplifiers 59X and 59Y off until the matched filter begins to conduct.

Figure 5:
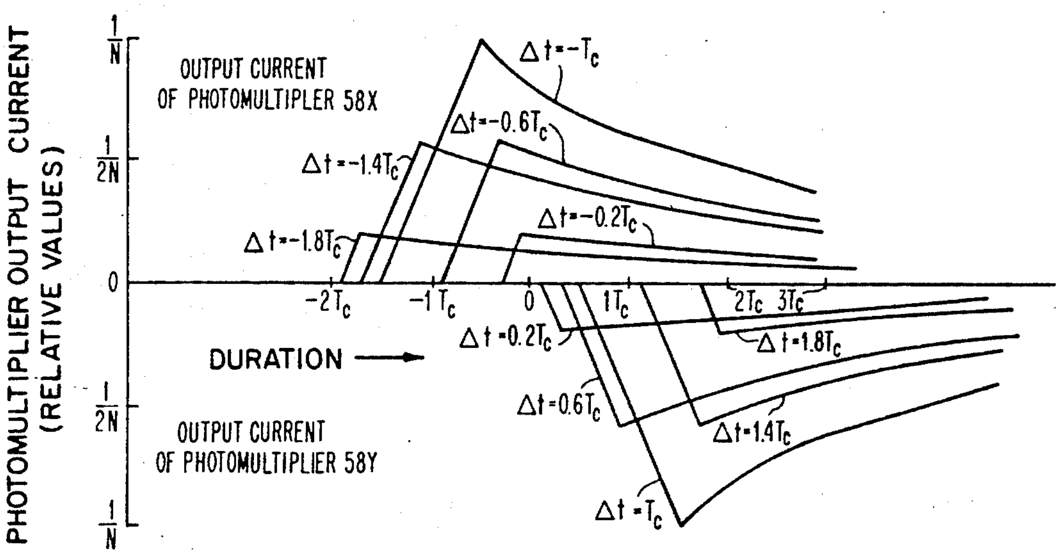
FIG. 5 is a graphical representation of error signals generated in photomultipliers associated with tracking channels when the reference and demultiplexed pulses are precisely synchronized and when they are not.

The functional relationship between the output current of the two photomultipliers 58X and 58Y of the tracking channels and a time delay $\Delta t$ between the synchronization and data pulses of the spatial and reference waveforms is shown in FIG. 5. The pulses from the coincidence detectors in the tracking channels are assumed to be rectangular. No error signals are generated when the reference and spatial waveform are in synchronism. When the reference waveform is advanced relative to the spatial waveform, the error signal from the photomultiplier 58X increases and reaches its largest value when the time delay $\Delta t$ between the reference and spatial waveforms is equal to the duration $T_c$ of the optical pulses ($\Delta t = -T_c$). Conversely, when the reference waveform is delayed relative to the spatial waveform, the error signal from the photomultiplier 58Y has a similar characteristic.

To give a specific example, assume that the reference waveform of the data and synchronization channels is advanced by $0.6T_c$ ahead of the spatial waveform ($\Delta t = -0.6T_c$). Then the reference pulse in channel X, which is ordinarily delayed by $T_c$ with respect to the spatial pulse, is now delayed by $T_c - 0.6T_c = 0.4T_c$ with respect to the spatial pulse. The reference pulse in channel Y, which is ordinarily advanced by $\Delta t = T_c$ with respect to the spatial pulse, is now delayed by $T_c + 0.6T_C = 1.6T_c$. FIG. 6 shows the output of photomultiplier 58X for $\Delta t = -0.6T_c$ has a relative maximum amplitude of around 1/2N. Photomultiplier 58Y does not conduct. The output of photomultiplier 58X is converted to a voltage for driving the variable delay means 70 as already explained and the next reference pulse is delayed by $0.6T_c$, thereby bringing the reference pulses into synchronization with the spatial pulses.

To summarize, I have described an optical multiplexed communication system which is superior to those in the prior art for synchronizing the operation of the transmitter and receiver. The key feature of my invention is the use of a coded optical waveform which follows a pseudo-random sequence termed "perfect incoherent word" which accompanies the multiplexed data sequence. In the receiver, the data and incoherent sequences are demultiplexed into separate channels and presented to an array of detectors. The coded sequence so detected is presented to a matched filter and generates a large output therefrom. This ensures that the pulses detected in the data detectors are "true" data. Any time-shifted incoherent sequence is of such small magnitude when compared to the original sequence that the matched filter generates virtually no output. Thus, any pulses in the data channels of the receiver accompanying the time-shifted sequences may be characterized accurately as "false" and ignored.

While the invention has been particularly shown and described with reference to a preferred embodiment thereof, it will be understood by those skilled in the art that various changes in form and detail may be made therein without departing from the spirit and scope of the invention.

For example, the use of parametric up-converters as coincidence detectors is preferred but not required. In addition, the variable delay means illustrated might be replaced by other well known types.

What is claimed is:

1. An optical communication system comprising:

a first source of narrow optical pulses polarized in a first plane;

means for dividing each first source pulse into a set of diminished data and synchronization pulses, said synchronization pulses being characterized as a perfect incoherent word, and for transmitting each data and synchronization pulse on separate transmitter channels;

shutter means interposed in each data transmitter channel for selectively transmitting the data pulses in pulse-no pulse binary form;

means for converting the data pulses passed by the shutter means and the synchronization pulses into an interleaved optical beam;

receiver means for demultiplexing and time-sorting the multiplexed pulses into separate data and synchronization receiver channels;

a second source of narrow, optical reference pulses, said reference pulses being polarized in a second plane orthogonally with respect to said first pulses;

means for dividing each second source pulse into a set of diminished reference data and synchronization pulses and for transmitting each reference pulse into separate data and synchronization channels;

means for optically combining a demultiplexed data and a synchronization pulse with reference pulse in each of said respective data and synchronization receiver channels;

synchronization pulse detection means interposed in each synchronization receiver channel for generating output pulses when a demultiplexed synchronization pulse and a reference synchronization pulse coincide;

matched filter means for generating an output when the synchronization pulse detection means generate outputs simultaneously; and data pulse detection means interposed in each data receiver channel for generating outputs when a demultiplexed data pulse and a reference data pulse coincide, said outputs being ignored unless the matched filter means generates an output at the same time.

2. An optical communication system as in claim 1 wherein the pulse sources are mode-locked lasers.

3. An optical communication system as in claim 1 further comprising means for removing demultiplexed data pulses from said synchronization receiver channels prior to impinging on said synchronization pulse detection means.

4. An optical communication system as in claim 3 wherein said removing means comprising: ~ first polarizing means disposed in said transmitter synchronization channels for rotating the polarization of said synchronization pulses from said first plane to said second plane, thereby causing said transmitted data and synchronization pulses to be polarized in orthogonal directions;

second polarizing means interposed between said demultiplexing receiver means and each said optical combining means in each said synchronization receiver channel for rotating the polarization of the data and synchronization pulses received in said synchronization receiver channels, thereby causing the synchronization pulses to be polarized in said first plane and the data pulses to be polarized in said second plane;

said optical combining means in each said synchronization receiver channel disposed to pass into the receiver channel a pulse polarized in said first plane and to pass out of the system a pulse polarized in said second plane, thereby causing data pulses in said synchronization receiver channels to be passed out of the system.

5. An optical communication system as in claim 4 wherein said first and second polarizing means are half-wave plates; and said optical combining means comprises an array of nicol prisms.

6. An optical communication system as in claim 1 further comprising:

tracking means for bringing said demultiplexed and reference pulses into precise synchronization when they are out of synchronization.

7. An optical communication system as in claim 6 wherein the tracking means comprises:

means for further dividing said first source pulse into first and second tracking pulses and for transmitting the tracking pulses on separate transmitter channels;

means for transmitting the tracking pulses on the interleaved beam containing the data and synchronization pulses;

receiver means for demultiplexing and time-sorting the multiplexed tracking pulses into first and second tracking channels, separate from the data and synchronization channels;

first and second reference tracking pulses derived from said second source of narrow, optical reference pulses and transmitted on said tracking channels;

means for delaying the first reference tracking pulse associated with the first demultiplexed tracking pulse in the first receiver tracking channel and means for advancing the second reference tracking pulse associated with the second demultiplexed tracking pulse for an interval sufficient to ensure that the pulses do not overlap when the demultiplexed data and synchronization pulses are coincident with the reference data and synchronization pulses;

first and second tracking detection means interposed in said first and second receiver tracking channels, respectively, said first detection means for generating an output when a first demultiplexed tracking pulse overlaps a first reference tracking pulse, thereby indicating that the reference data and synchronization pulses are advanced with respect to the demultiplexed data and synchronization pulses, said second detection means for generating an output when a second demultiplexed tracking pulse overlaps a second reference tracking pulse, thereby indicating that the reference data and synchronization pulses are delayed with respect to the demultiplexed data and synchronization pulses; and variable delay means connected to said outputs of said tracking detection means for delaying or advancing the reference pulses from said second source to bring the reference pulses into synchronization with the demultiplexed pulses.

8. An optical communication system as in claim 1 wherein the means for converting the data and synchronization pulses into an interleaved beam comprises:

means interposed in each transmitter channel for providing the path of each channel with a characteristic length different from the length of any other channel path and for multiplexing the pulses in one output beam; and the receiver means for demultiplexing and time-sorting the multiplexed data and synchronization pulses comprises means interposed in each receiver channel for demultiplexing the multiplexed pulses and for compensating for the delays introduced in the transmitter, thereby equalizing the length of each channel path.

9. An optical communication system as in claim 8 wherein:

the converting and multiplexing means comprises a first array of beam splitters, one in each channel, said array disposed to transmit pulses reflected therefrom along a single beam; and the receiver demultiplexing and time-sorting means comprising a second array of beam splitters, one in each channel, said array disposed in reverse order with respect to the first array.

10. An optical communication system as in claim 1 wherein each said data and synchronization detection means is a non-linear parametric up-converter capable of producing a sum-frequency output of the two mutually orthogonally polarized pulses coincident upon it.

11. An optical communication system as in claim 10 wherein the matched filter means comprises:

a photomultiplier;

means for focusing the output pulses from the up-converters in the synchronization channels into the photomultiplier; and means for detecting an output from the photomultiplier when the pulses from the up-converters in the synchronization channels impinge on the photomultiplier simultaneously.

12. An optical communication system comprising:

a first source of narrow optical pulses polarized in a first plane;

means for dividing each first source pulse into a set of diminished data, synchronization and first and second tracking pulses, said synchronization pulses being characterized as a perfect incoherent word, and for transmitting each data, tracking and synchronization pulse on separate transmitter channels;

shutter means interposed in each data transmitter channel for selectively transmitting the data pulses in pulse-no pulse binary form;

first polarizing means disposed in said transmitter synchronization channels for rotating the polarization of said synchronization pulses from said first plane to said second plane, thereby causing the synchronization pulses to be polarized orthogonally with respect to said data and tracking pulses;

means for converting the data pulses passed by the shutter means and the tracking and synchronization pulses into an interleaved optical beam;

receiver means for demultiplexing and time-sorting the multiplexed pulses into separate data and synchronization receiver channels;

a second source of narrow, optical reference pulses, said reference pulses being polarized in a second plane orthogonally with respect to said first pulses;

means for dividing each second source pulse into a set of diminished reference data, tracking and synchronization pulses and for transmitting each reference pulse into separate data and synchronization receiver channels;

means for delaying the first reference tracking pulse associated with the first demultiplexed tracking pulse in the first receiver tracking channel and means for advancing the second reference tracking pulse associated with the second demultiplexed tracking pulse for an interval sufficient to ensure that the pulses do not overlap when the demultiplexed data and synchronization pulses are coincident with the reference data and synchronization pulses;

means disposed in each data and synchronization receiver channel for optically combining demultiplexed data and synchronization pulses with respective reference data and synchronization pulses;

second polarizing means interposed between said demultiplexing receiver means and each said optical combining means in each said synchronization receiver channel for rotating the polarization of the data, tracking and synchronization pulses received in said synchronization receiver channels, thereby causing the synchronization pulses to be polarized in said first plane and the data and tracking pulses to be polarized in said second plane;

said optical combining means in each said synchronization receiver channel disposed to pass into the receiver channel a pulse polarized in said first plane and to reflect out of the system a pulse polarized in said second plane, thereby causing data and tracking pulses in said synchronization receiver channels to be reflected out of the system;

synchronization pulse detection means interposed in each synchronization receiver channel for generating output pulses when a demultiplexed synchronization pulse and a reference synchronization pulse coincide;

matched filter means for generating an output when the synchronization pulse detection means generate outputs simultaneously;

data pulse detection means interposed in each data receiver channel for generating outputs when a demultiplexed data pulse and a reference data pulse coincide, said outputs being ignored unless the matched filter means generates an output at the same time;

first and second tracking detection means interposed in said first and second receiver tracking channels, respectively, said first detection means for generating an output when a first demultiplexed tracking pulse overlaps a first reference tracking pulse, thereby indicating that the reference data and synchronization pulses are advanced with respect to the demultiplexed data and synchronization pulses, said second detection means for generating an output when a second demultiplexed tracking pulse overlaps a second reference tracking pulse, thereby indicating that the reference data and synchronization pulses are delayed with respect to the demultiplexed data and synchronization pulses; and variable delay means connected to said outputs of said tracking detection means for delaying or advancing the reference pulses from said second source to bring the reference pulses into synchronization with the demultiplexed pulses.

13. An optical communication system as in claim 12 wherein:

said first and second polarizing means are half-wave plates;

said optical combining means comprises an array of nicol prisms;

said means for converting the pulses into an interleaved beam comprises means interposed in each transmitter channel for providing the path of each channel with a characteristic length different from the length of any other channel path and for multiplexing the pulses in one output beam; and said receiver means for demultiplexing and time-sorting the multiplexed pulses comprises means interposed in each receiver channel for demultiplexing the multiplexed pulses and for compensating for the delays introduced in the transmitter, thereby equalizing the length of each channel path.

14. An optical communication system as in claim 13 wherein the converting and multiplexing means comprises a first array of beam splitters, one in each channel, said array disposed to transmit pulses reflected therefrom along a single beam;

the receiver demultiplexing and time-sorting means comprises:

a second array of beam splitters, one in each channel, said array disposed in reverse order with respect to said first array; and delay means disposed in said data receiver channels for compensating for delays introduced in said synchronization channels by said half-wave plates.

15. An optical communication system as in claim 12 wherein each said data, synchronization and tracking detection means is a non-linear parametric up-converter capable of producing a sum-frequency output of the two mutually orthogonally polarized pulses coincident upon it.

16. An optical communication system as in claim 15 wherein the matched filter means comprises:

a photomultiplier;

means for focusing the output pulses from the up-converters in the synchronization channels into the photomultiplier; and means for detecting an output from the photomultiplier when the pulses from the up-converters in the synchronization channels impinage on the photomultiplier simultaneously.

* * * * *

UNITED STATES PATENT OFFICE
CERTIFICATE OF CORRECTION

Patent No. 3,699,344 Dated October 17, 1972

Inventor(s) Elisabeth M. Rutz

It is certified that error appears in the above-identified patent and that said Letters Patent are hereby corrected as shown below:

Column 10, line 53, "as $E_{ew}$ " should read --$E_e^w$ --.

Column 10, line 53, "as $E_{ow}$:o" should read --$E_o^w$:o--.

Column 11, line 6, "$E_{ow}$" should read --$E_o^w$--.

line 7, "$E_{ew}$" should read --$E_e^w$--.

line 10, "$E_{ow}$" should read --$E_o^w$--.

line 14, "$E_{ew}$ and $E_{ow}$" should read --$E_e^w$ and $E_o^w$--.

Claim 1, line 16, after "synchronization" insert --receiver--.

Signed and sealed this 20th day of November 1973.

(SEAL)
Attest:

EDWARD M.FLETCHER,JR.
Attesting Officer

RENE D. TEGTMEYER
Acting Commissioner of Patents